United States Patent
Mowatt et al.

(10) Patent No.: US 9,122,845 B2
(45) Date of Patent: Sep. 1, 2015

(54) CONTROLLED APPLICATION DISTRIBUTION

(71) Applicant: Microsoft Technology Licensing, LLC, Redmond, WA (US)

(72) Inventors: David Mowatt, Dublin (IE); Terry Farrell, Dublin (IE); Pieter Kasselman, Dublin (IE); Krishnan Raghupathi, Dublin (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/833,259

(22) Filed: Mar. 15, 2013

(65) Prior Publication Data

US 2014/0283092 A1 Sep. 18, 2014

(51) Int. Cl.
*G06F 21/00* (2013.01)
*G06F 21/10* (2013.01)
*G06F 21/12* (2013.01)

(52) U.S. Cl.
CPC ............ *G06F 21/105* (2013.01); *G06F 21/121* (2013.01); *G06F 2221/2115* (2013.01)

(58) Field of Classification Search
USPC .......................................................... 726/26
See application file for complete search history.

(56) References Cited

U.S. PATENT DOCUMENTS

| | | |
|---|---|---|
| 2003/0028622 A1 | 2/2003 | Inoue et al. |
| 2009/0327091 A1* | 12/2009 | Hartin et al. ............ 705/26 |
| 2010/0082448 A1 | 4/2010 | Lin et al. |
| 2010/0083386 A1 | 4/2010 | Kline et al. |
| 2012/0023596 A1* | 1/2012 | Womack et al. ............ 726/29 |
| 2012/0109826 A1 | 5/2012 | Kobres |
| 2012/0185342 A1 | 7/2012 | Onghai |
| 2012/0316975 A1 | 12/2012 | Schorr et al. |

OTHER PUBLICATIONS

Foresman, Chris, "Apple Brings Back App "Gifting" Straight From Your iOS Device (Updated)," Dec. 14, 2012, retrieved from http://arstechnica.com/apple/2012,12/apple-brings-back-app-gifting-straight-from-your-ios-device/, 3 pp.
Thompson, Martin, "Adobe Licensing Quick Guide," Mar. 23, 2010, retrieved from http://www.itassetmanagement.net/2010/03/23/adobe-licensing-quick-guide/, 11 pp.
"How to Purchase Multiple Licenses of an App?" retrieved Jan. 3, 2013 from http://www.assistiveware.com/support/faq/page/51, 2 pp.
International Search Report & Written Opinion dated Jul. 1, 2014 in PCT Application No. PCT/US2014/025190.

* cited by examiner

*Primary Examiner* — Ghazal Shehni
(74) *Attorney, Agent, or Firm* — Steve Crocker; Jim Ross; Micky Minhas

(57) ABSTRACT

An application sender can control the distribution and use of an application using an authorization token encapsulating distribution terms submitted by the application sender and the application license specification submitted by a developer of the application. The application sender can access an application store and perform various functions such as selecting one or more applications for use by an application receiver, combining one or more applications into a bundle for use by an application receiver, and/or combining several applications to form a new application for use by an application receiver. The application receiver can utilize the application in accordance with the authorization token generated by the distribution terms.

18 Claims, 9 Drawing Sheets

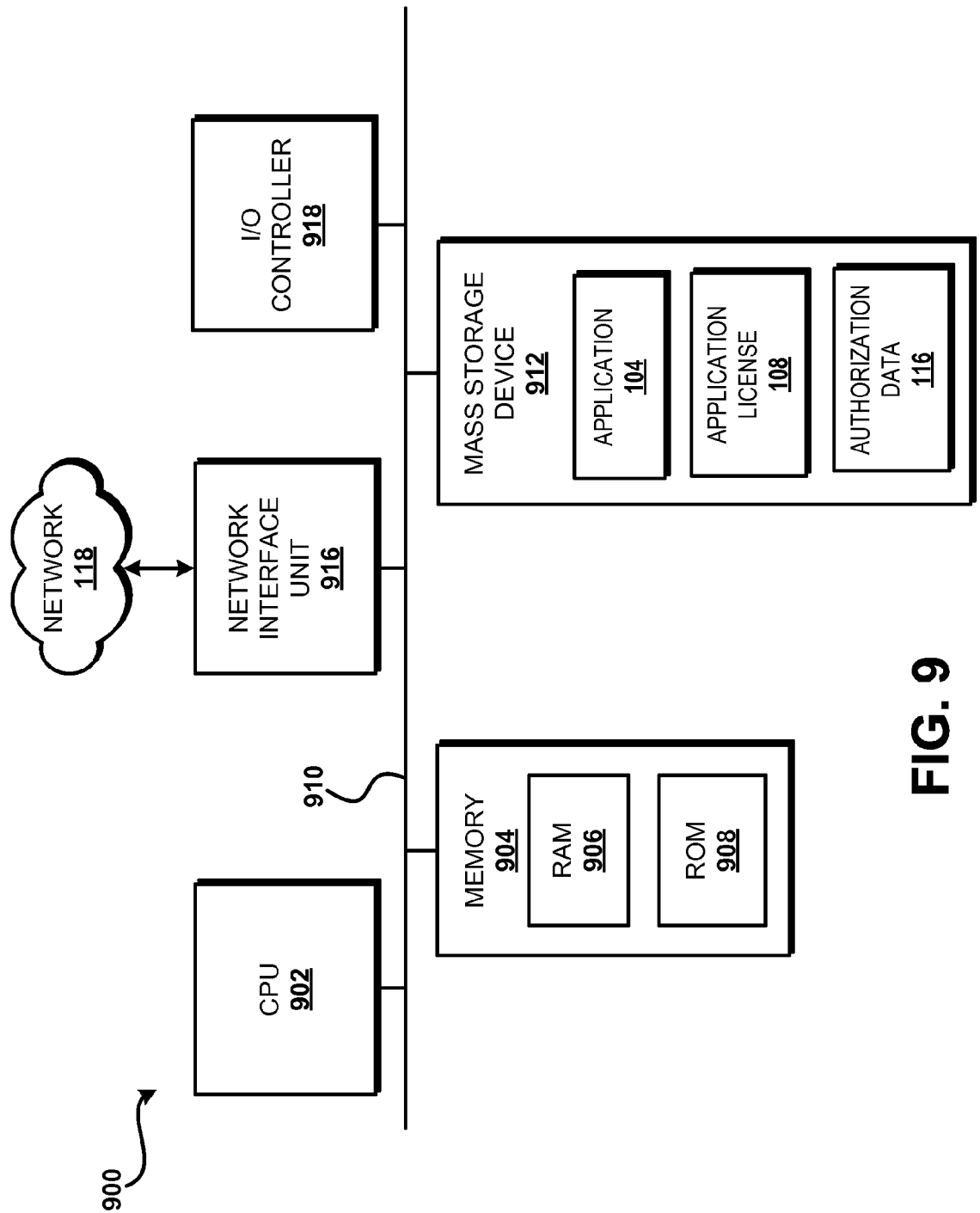

CONTROLLED APPLICATION DISTRIBUTION

BACKGROUND

The technology industry is evolving from a model of shrink-wrapped software to distributing applications. Applications can be distributed to users by providing a location or link that allows the user to download the application to the user's computer. Applications can also be distributed by making a service provided by a software product available to a user. An example of a service delivery is the "Software as a Service" (SaaS) model in which the software product is centrally hosted on a remote server accessible by a user through a communication network. Application distribution models typically involve an individual paying money, or other form of value, to an application store in order to use an application. Typically, the application store passes on a certain percentage of the transaction total to the developer of the application in the form of a license payment. In many application stores, a purchase that a user makes in the application store is recorded against that user's identity. For example, it is not atypical for a user to be required to generate an account or to sign into an existing account in order to purchase an application. Although the reasons may vary, this is often done in order to track who is entitled to use the application and to track the user's license rights.

Conventional distribution models described above can work well for individuals who are purchasing the use of applications for their own enjoyment or their own productivity needs. But, the individualized application purchasing experience provided by typical application stores does not facilitate a collaborative environment. For example, the client of an architect may not have previously purchased one or more applications that allow the client to view or edit plans that the architect may want to share with the client. Although there may be various reasons for this, typically, the client would have no need to purchase the application outside of the collaboration with the architect. In another example, a user may work on a project involving multiple companies and wish for the other companies to use a particular project management application. The companies may not have the experience or expertise to make an informed decision on which applications are needed in order to collaborate with the user.

Conventional application marketplaces provide various solutions to the problems described above, but each are limited. For example, each user could simply buy the application themselves, but as explained above, the experience and expertise of the user may bring into question the value of purchasing the application. Also, the user of the application may not want to create an account or enter in financial information to an application store in order to purchase an application that may be used for a short period of time. Other solutions also exist where multiple licenses of the application are bought for a particular company, but these solutions typically only work where each user is already in a corporate address book. As a result, this approach may not work well across company boundaries. Finally, a developer might also enable multiple users to buy applications for others through a Web site provided by the developer. This approach, however, requires significant development effort to create an application marketplace on the part of each and every developer.

It is with respect to these and other considerations that the disclosure made herein is presented.

SUMMARY

Concepts and technologies are described herein for a mechanism for distributing applications. In accordance with some concepts and technologies disclosed herein, an application sender can access an application store to select one or more applications to be used by an application receiver. The application store can be a clearinghouse for supplying and licensing the application to the application receiver. The application sender can submit distribution terms for one or more of the selected applications. The distribution terms can include, but are not limited to, a time in which an application receiver can secure the right to use the application, a time indicating how long an application receiver can use the application, an identity of the application receivers, and/or the number of people authorized to use the application. The application sender may submit or modify the distribution terms using various technologies, such as an interface provided by an application store or an executable program on the application sender's computing system.

The application store may verify that the distribution terms comply with the provisions set forth in the application license specification. The application license specification may be provided by the developer of the application or may be provided by another source, such as the application store providing the application. The application store can use the distribution terms to generate an authorization token. The authorization token may encapsulate the application license specification provided by the developer of the application and the distribution terms provided by the application sender. The application store may then generate a receiver license, which is a license that controls the use of the application by the application receivers.

The receiver license may account for the application license specification provided by the application developer, restrictions or terms added by the application store, and/or the distribution terms provided by the application sender. In some implementations, the application sender can use the authorization token to control the access of application receivers to more than one application, multiple instances of the same application, or various combinations thereof. In some implementations, the application receiver may not be required to pay for the application, may be required to pay a different amount, or may use a different type of value to acquire the application.

The application sender can transmit to the application receiver a communication that is intended to permit the application receiver to use the application. In some uses, the communication can make use of the authorization token. The application receivers can submit information associated with the authorization token to the application store to gain access to the application. The communication from the application sender to the application receivers can also make use of a password, a personal identification number, an identification of the application(s), and/or the application.

It should be appreciated that the above-described subject matter may also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the concepts and technologies disclosed herein, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 9 is a computer architecture diagram showing an illustrative computer hardware and software architecture for a computing system capable of implementing aspects of the embodiments presented herein.

DETAILED DESCRIPTION

Figure 1:
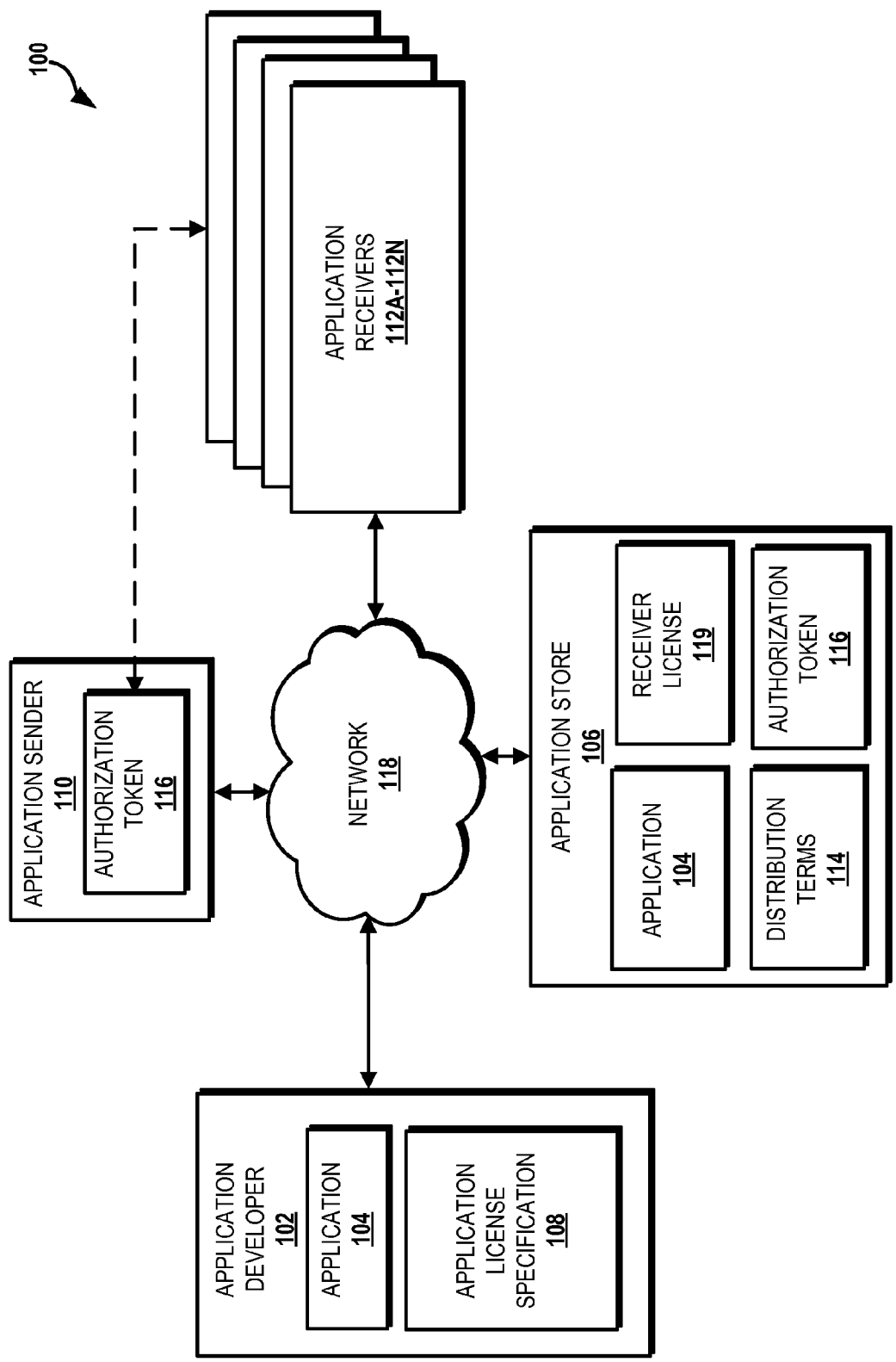
FIG. 1 is a system diagram showing one illustrative operating environment that may be used to implement various embodiments disclosed herein.

The following detailed description is directed to concepts and technologies for distributing applications. In accordance with some concepts and technologies disclosed herein, an application sender can control the distribution and use of an application using an authorization token. The authorization token can be used by application receivers to gain access to and use one or more applications associated with the authorization token. To generate the authorization token, the application sender can access an application store and select one or more applications for use by an application receiver. The application sender can submit a set of distribution terms and a payment to the application store, if required. Once submitted, the application sender may receive the authorization token. The authorization token can encapsulate the application license specification, any restrictions provided by the application store, and the distribution term. This information may be used to generate a receiver license, which may also be encapsulated in the authorization token. The receiver license controls the use of the distribution of the application to the application receiver. It should be understood that the concepts and technologies described herein are not limited to any particular type of distribution model. For example, an application can be downloaded to a local computer used by a user. In another example, an application may be delivered as a service under the SaaS model.

Some implementations of the concepts and technologies described herein may enable or enhance collaboration between several individuals. For example, an application sender may be an individual in an organization that needs to collaborate with other individuals, the application receivers. As part of the collaborative effort, the application receivers may need to use a specific application. In some configurations, the application sender can access an application store and select an application for use by the application receivers. The application sender can submit to the application store a set of distribution terms under which the application is to be distributed. The application sender can thereafter receive an authorization token.

The application sender can send a communication to the application receivers, indicating that the right to use the application has been secured. The communication can include the authorization token and additional information, if any, that the application receivers use to gain access the application. In another implementation, the communication may not include the authorization token, but rather, may include instructions on how to retrieve the authorization token. In a further implementation, the application receivers may never receive the authorization token. Once the collaborative task is complete, or for other reasons, the application sender can modify the distribution terms to revoke the ability of the application receivers to use the application. In some configurations, the distribution terms may be configured to revoke the use of the application without the need to modify the distribution terms. For example, the distribution terms may include a time in which the application receivers can use the application. In this example, the application sender may not need to modify the distribution terms to revoke the usage rights because the distribution terms have already been configured to revoke the ability to use the application. In a further example, the distribution terms may establish a set of consumable rights, such as the number of times a document can be printed.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodologies for distributing applications and other aspects will be presented.

Referring now to FIG. 1, aspects of an operating environment 100 for the various embodiments presented herein will be described. The operating environment 100 shown in FIG. 1 includes an application developer 102 that develops an application 104 to be made available for purchase in an application store 106. As used herein, the term application refers to any type of software program configured for use on computing devices. In some configurations, an application can include a program specifically designed for use on a mobile device, such as a wireless smartphone or a tablet computing device, although the concepts and technologies described herein are not limited to the type of computing device upon which the application is executed. As used herein, the term "purchase" refers to a transaction in which a right to use the application is granted or an ability to use the application is received. For example, a purchase may include the receipt of the right to use an application under a license. As used herein, a "transaction" includes an activity involving two or more parties.

Additionally, the concepts and technologies described herein are not limited to any particular size of program designated as an application, as some applications can be small, compact programs, while other applications can be larger programs. Further, in some configurations, an application can be a standalone program or may be a program configured for execution within another program. As used herein, the term "application store" can include various locations from which the application 104 can be purchased. For example, the application store 106 can be the WINDOWS STORE provided by Microsoft Corp. of Redmond, Wash., the ITUNES application store provided by Apple Inc. of Cupertino, Calif., or the GOOGLE PLAY application store provided by Google, Inc. of Mountain View, Calif.

The application developer 102 may want to define the conditions under which the application 104 is distributed. The application developer 102 may provide an application license specification 108 to the application store 106. The application license specification 108 may include the licensing terms of the application 104. It should be noted that the present disclosure is not limited to any particular type of license. For example, the application developer 102 may use an open source license such as GNU GPL, GNU LGPL, APACHE, BSD, and others. In another implementation, the application developer 102 may use a proprietary license. In other configurations, the application developer 102 may use a license required or provided by the application store 106. The concepts and technologies described herein are not limited to any particular license. The application developer 102 can associate the application 104 with the application license specification 108 and place the application 104 within the application store 106 for purchase. In some configurations, the application license specification 108 may be amended or augmented by the application store 106. For example, the application store 106 may place additional restrictions on the application 104. In other configurations, the application license specification 108 may be a hardcoded default license encapsulated in the application store 106, or combinations thereof.

Once placed in the application store 106, the application 104 may be made available for purchase by various users. In implementations of the presently disclosed subject matter, an application sender 110 may wish to purchase the rights to one or more copies of the application 104 for use by one or more application receivers 112A-112N (hereinafter the application receivers 112A-112N are referred to collectively and/or generically as "the application receivers 112", or by designation individually as "the application receiver 112A," "the application receiver 112B," and so forth). Although the concepts and technologies described herein are not limited to any specific implementation, feature or advantage, the application sender 110 may want to purchase the rights to one or more copies of the application 104 for the application receivers 112 when working in a collaborative environment.

For example, the application sender 110 may be a company hired to perform a task by the application receivers 112. In order to demonstrate the work product to the application receivers 112, the application sender 110 may need to allow for a limited use of the application 104 by the application receivers 112. In another example, the application sender 110 and the application receivers 112 may be working on a project for the same entity. The application sender 110 may have an expertise in an area that, in order to collaborate with the application receivers 112, requires the application receivers 112 to use the application 104. The application sender 110 may facilitate the collaborative effort by coordinating the application 104 for use by the application receivers 112.

When purchasing the application 104 for use by the application receivers 112, the application sender 110 may determine that a level of control over the application 104 is desired in addition to any limitations that may be imposed by the application developer 102 delineated in the application license specification 108 and/or restrictions placed on the application 104 by the application store 106. As used herein, the term a "level of control" refers to the ability of the application sender 110 to manage, in some manner, the distribution and/or use of the application 104 in accordance with the needs or desire of the application sender 110.

In order to provide a level of control to the application sender 110, the application sender 110 may submit a set of distribution terms 114 in conjunction with purchasing the rights to the application 104. As mentioned briefly above, the distribution terms 114 can include, but are not limited to, the identities of the application receivers 112 for which the application sender 110 is purchasing the rights of the application 104, a time in which the application receivers 112 can use the application 104, and a time in which the application receivers 112 must secure the rights to the application 104. The application sender 104 may change the distribution terms 114 to control various aspects of use and/or distribution of the application 104. In some configurations, the application sender 110 can modify the distribution terms 114 to modify the use of the application 104.

The distribution terms 114 may be controlled by the application license specification 108 and/or restrictions placed on the application 104 by the application store 106. The application license specification 108 may limit the ability of various parties to modify the application 104. For example, the application license specification 108 may require that the name of the application 104 cannot be changed. In another example, the application license specification 108 limit the modification of various features in the application, such as changing imagery, screenshots, and the like.

Upon receipt of payment from the application sender 104, if any is required, or any information or data necessary to complete the purchase, an authorization token 116 is generated. The authorization token 116 may be generated by the application store 106 or another entity. For example, the application store 106 can persist the distribution terms 114 and, from this, generate an authorization token 116. The authorization token 116 can be data or other form of information used by the application store 106 to associate the application 104 with the distribution terms 114. In one implementation, the authorization token 116 can encapsulate the distribution terms 114. In another implementation, the authorization token 116 can encapsulate the application license specification 108 as well as any additional restrictions or terms provided by another entity, such as the application store 106. In further implementations, the authorization token 116 can encapsulate the application license specification 108, the distribution terms 114, restrictions placed on the application 104 by the application store 106, or combinations thereof.

In some configurations, the application sender 110 may change data associated with the authorization token 116 by submitting new distribution terms 114 or changing the distribution terms 114 currently in use. The authorization token 116 may be data, executable code, hardware, software, or any other technology that can be used to authenticate a transaction or a specific user. The authorization token 116 can be permanent until deleted or may be temporary with an expiry.

The application sender 110 can send the authorization token 116 in a communication to the application receivers 112A-112N, notifying the application receivers 112 that the use of the application 104 has been secured by the application sender 110. In a different implementation, the communication may not include the authorization token 116, but rather, may include instructions to the application receivers 112 as to how to retrieve the authorization token 116. As used herein, a "communication" can include any type of electronic communication including, but not limited to, an email, an instant message, and a short message system ("SMS") message. The application receivers 112 can thereafter access a network 118 to access the application store 106 to obtain the use of application 104 using the authorization token 116. It should be appreciated that the concepts and technologies described herein are not limited to any particular type of network used for the network 118. In some configurations, the network 118 can include the Internet, an intranet, an extranet, or various combinations thereof.

The present disclosure is not limited to any particular manner in which the application receivers 112 gain access to use the application 104. In one configuration, if the application 104 is downloaded software, the application receivers 112 may be required to submit the authorization token 116 to the application store 106 to download the application 104 or may be required to use the authorization token 116 in order to execute the application. In another configuration, if the application 104 is distributed as a SaaS, the application receivers 112 may be required to use to the token to access one or more services provided by the application 104.

In some configurations, the application sender 110 may distribute and control access to the application 104 in a manner similar to the application store 106. For example, the application sender 110 may have stored on a computing device (not shown) used by the application sender 110 a copy of the application 104. In this example, when the application receivers 112 receive a communication notifying the application receivers 112 that the application 104 is ready for use, the application receivers 112 may communicate back to the application sender 110. Upon a successful completion of the transaction, the application receivers 112 may receive the application 104 from the application sender 110 rather than from the application store 106.

In some configurations, payment of license fees to the application developer 102 may be controlled by certain criteria and performed in various ways. In one implementation, the application license specification 108 may specify how license fees are paid. The application license specification 108 may include the price, the timing of reimbursement, as well as other terms. The application 104 may utilize one or more third party services, such as storage on Microsoft Azure. In such cases, the application license specification 108 may define whether it is the sender or the recipient who pays, and perhaps up to what threshold. In some configurations, the application sender 110 may be able to override payment terms established by the application license specification 108.

In some implementations, the application license specification 108 may define different price points based on certain characteristics of the receiver, such as the country they live in or the software they use. For example, the application license specification 108 may provide discounts if the application sender 110 or the application receivers 112 already own other applications by the developer 102. In some implementations, the purchase price of the application 104 may be discounted if the application sender 110 buys the application 104 for a certain number of application receivers 112. In some configurations, such discounts may only be valid if the application sender 110 provides a certain coupon code at purchase, as specified by the application license specification 108. In another example, the payment of the application 104 may only be processed when one of the application receivers 112 performs a certain act associated with the application 104, such as the use of a specific feature. These and other payment variations are considered to be within the scope of the present disclosure.

The license payment may be processed in various ways. In one configuration, a license payment may be processed when the application sender 110 sends a payment to the application store 106 for the right to use the application 104. In another configuration, the license payment may be processed at a later time. For example, the license payment may be processed when one of the application receivers 112 sends a communication to the application store 106 to use the application 104. It should be appreciated that the concepts and technologies described herein are not limited to any particular implementation of license payments, nor are the concepts and technologies limited to applications that require payment.

The operating environment 100 may also provide for the ability of the application sender 110 to perform an audit. The application sender 110 may wish to perform an audit for various reasons including, but not limited to, verifying that the application receivers 112 are the correct parties using the application 104. Since the application sender 110 may be the party submitting a payment for the right to use the application 104, the application sender 110 may want to ensure that the application 104 is being distributed according to the set of distribution terms 114 established by the application sender 110. For example, the application sender 110 may be provided with various information including, but not limited to, a list of the application receivers 112 and a date of redemption of the authorization token 116. In some instances, the identity of a particular one of the application receivers 112 may not be obvious. In that configuration, to assist in the performance of the audit, as well as other uses, the application sender 110 may require personally identifiable information of the application receivers 112 prior to providing access to the application 104. In some implementations, the application sender 110 may be able to retract or revoke the license of one or more of the application receivers 112 using the information received from the audit.

Once the application receiver 112A-112N completes the transaction in accordance with the conditions encapsulated by the application token 116, the application receivers 112 may receive a receiver license 119. In some configurations, the terms of the receiver license 119 are established based on the application license specification 108, the distribution terms 114 and/or the restrictions imposed by the application store 106. The receiver license 119 may be different than a license that does not account for the distribution terms 114 submitted by the application sender 110. For example, the distribution terms 114 may specify a limited time of use or limited scope of services that the application receivers 112 may utilize, while the application license specification 108 may not have similar restrictions.

Further, the receiver license 119 may change without input from the application receivers 112. For example, the application sender 110 may modify the distribution terms 114 of the application 104. The change in the distribution terms 114 may modify the authorization token 116, which in turn may modify the receiver license 119. In some configurations, this may revoke the right of the application receivers 112 to use the application 104. The right or ability of the application receivers 112 to use the application 104 may be revoked in other ways. For example, and not by way of limitation, the application store 106 may modify the right of the application receivers 112 to use the application 104. The application sender 110 may access an interface to revoke the use of the application 104. These and other configurations are considered to be within the scope of the present disclosure.

The reasons for revoking the use of the application 104 by the application receivers 112 may vary. For example, if the use of the application 104 is purchased on a subscription basis, the expiration of a credit card used in the transaction require that the right to use the application is revoked in order to ensure future payment. Another example may be that the application sender 110 may get a refund, which revokes the receiver license 119 of the application receivers 112. A further example may be that the application sender 110 may have only purchased a time-limited use of the application 104, which then gets revoked upon expiration of the time. A still further example may be that the application sender 110 may have only purchased a use of the application 104 for a finite set of consumables, such as 100 text effect generated. After the consumables are used, the use of the application 104 may be revoked. In another example, the application sender 104 may transfer a time limited use of the application sender's 110 right to use the application. After that time expires, the right to use the application 104 may revert back to the application sender 110. It should be understood that the present disclosure is not limited to any particular reason for revocation.

Figure 2:
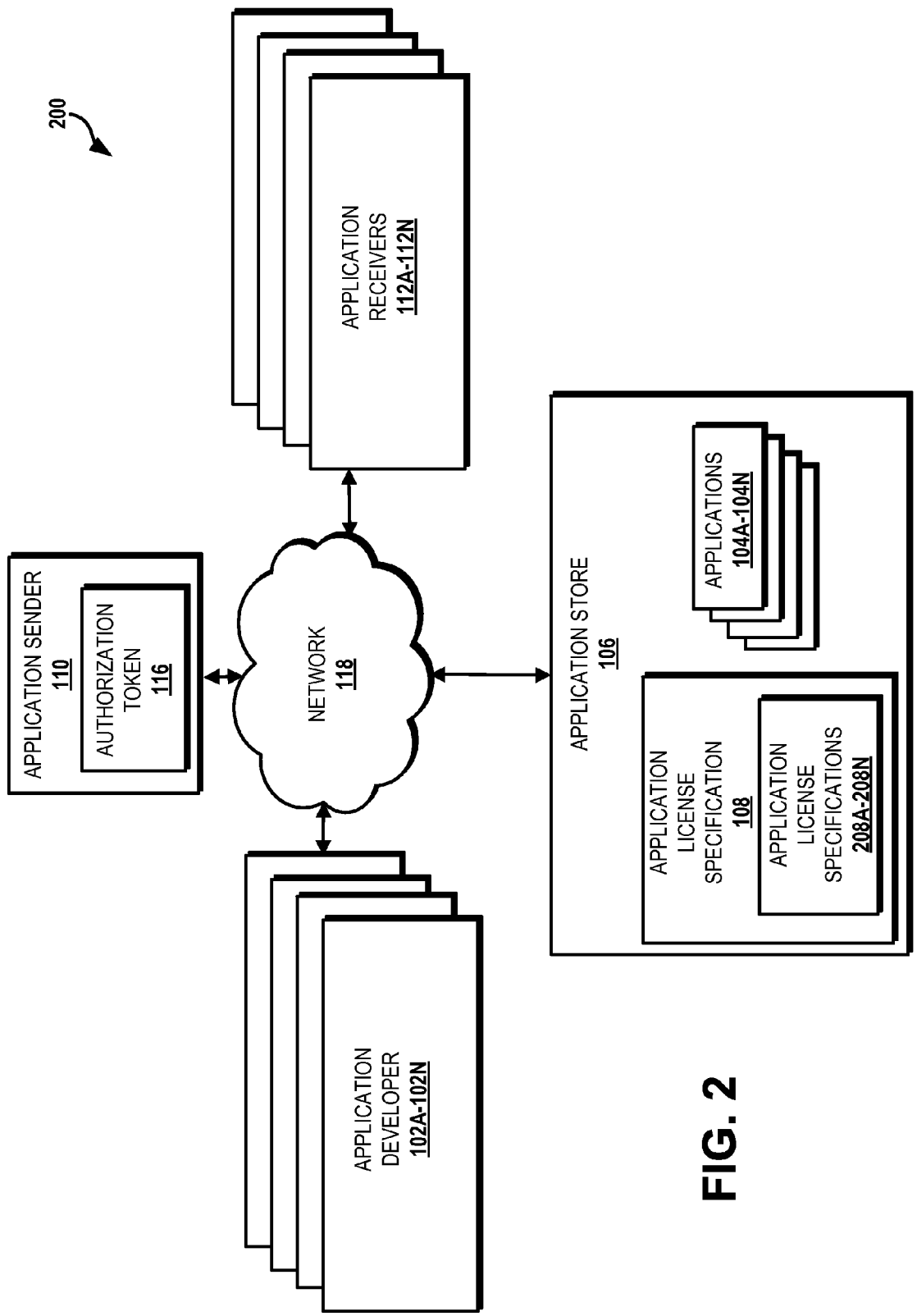
FIG. 2 is a system diagram showing a second illustrative operating environment in which multiple applications are bundled, in accordance with some embodiments.

As described above, the presently disclosed subject matter is not limited to the control of a single application. Various concepts and technologies described herein may be used to control multiple applications. For example, FIG. 2 shows another illustrative operating environment 200 in which several applications can be bundled. In the operating environment 200 of FIG. 2, the application sender 110 has designated multiple applications in an application group 104A-104N for use by the application receivers 112. In the operating environment 200, the application sender 110 has bundled the application group 104A-104N. The application group 104A-104N includes a number of applications 104. Although the concepts and technologies described herein are not limited to any particular advantage, bundling the application group 104A-104N may provide various advantages. For example, instead of forcing the application receivers 112 to individually purchase each of the applications that form the application group 104A-104N, the application receivers 112 can receive the right to use the application group 104A-104N in a single transaction. The application receivers 112 may not need to agree to separate licenses, make separate payments, or finish a transaction associated with one application and then proceed to a transaction involving another application.

Figure 3A:
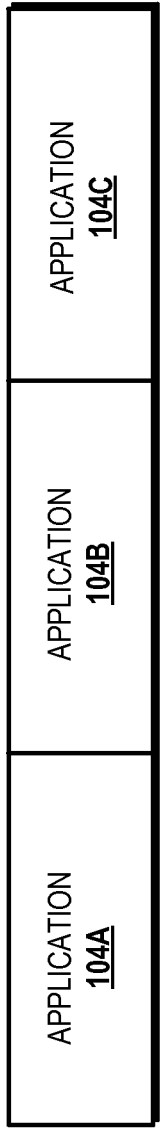
FIGS. 3A and 3B are software architecture diagrams illustrating exemplary application formats that can be controlled by an application sender, in accordance with some embodiments.
Figure 3B:
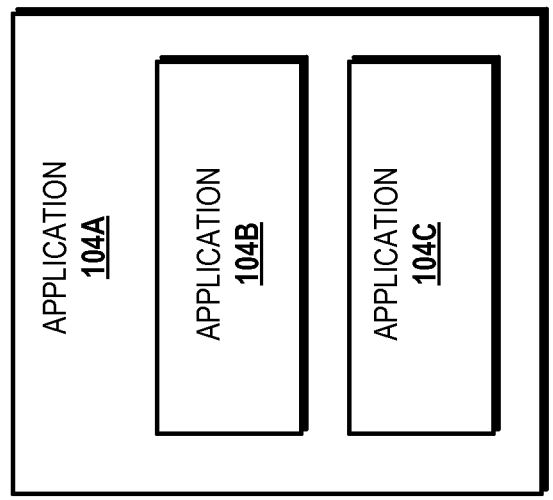

The applications 104A-104N can be bundled in various ways, illustrated by way of example in FIGS. 3A and 3B. In FIG. 3A, the functionality of the applications 104A-104C is linked so that the applications 104A-104C operate as a single unit. For example, each application of the applications 104A-104C may perform one or more functions that, when combined with the other applications of the applications 104A-104C, may provide the functionally needed or desired. In another implementation, the application sender 110 may have purchased varying levels of access to different applications in the application group 104A-104N. For example, the full use of the application 104A may be needed to achieve a particular goal, whereas only some of the use, or even a trial use of the application 104B may be needed. In another implementation, the applications may be integrated to form a new application or integrated into a pre-existing application, illustrated by way of example in FIG. 3B. The functionality of the application 104A may be enhanced or otherwise augmented by the functionality of the application 104B and the application 104C. In some configurations, the ability to bundle the applications 104A-104N may be based on the application license specifications 208A-208N for each, particular application.

As illustrated in FIGS. 3A and 3B, the functionality of various applications may be augmented or joined with other applications, or, other may have their functionality integrated into other applications. In some implementations of the concepts and technologies described herein, the licenses required to use the various applications may be integrated within each other and may be serviced by a single authorization token. For example, the license to the application 104A may have integrated within it the licenses to the applications 104B and 104C. Thus, in this configuration, the application receivers 112, when procuring the right to use the application 104A, may not need to secure the rights to the applications 104B and 104C in a separate transaction because the license to the application 104A has accounted for the licenses to the applications 104B and 104C.

In another configuration, the licenses to the applications may be joined together, as may be demonstrated by way of example in FIG. 3A. As described above, the applications 104A-104C are functionally combined but are not incorporated within each other. In that implementation, the licenses to the applications 104A-104C may be joined, but approved collectively via the use of the authorization token 116. For example, the licenses to the applications 104A-104C may be displayed to a user in a single form. The user, when accepting the distribution terms 114, may in turn approve implicitly the licensing terms to the applications 104A-104C.

Returning to FIG. 2, the application sender 110 can send a communication to the application receivers 112 providing information that allows the application receivers 112 the ability to use the application 104. In this configuration, instead of controlling the distribution of a single application, the authorization token 116 can be used to control the distribution of the application group 104A-104N. Thus, in this configuration, when the application group 104A-104N is bundled, the application license specification 108 associated with the authorization token 116 can include license specifications for all of the applications in the application group 104A-104N, represented in FIG. 2 as application license specifications 208A-208N. Although not limited to any particular reason, having the application license specifications 208A-208N bundled together into a single license can increase the convenience and or ease of use of the application group 104A-104N by the application receivers 112.

Figure 4:
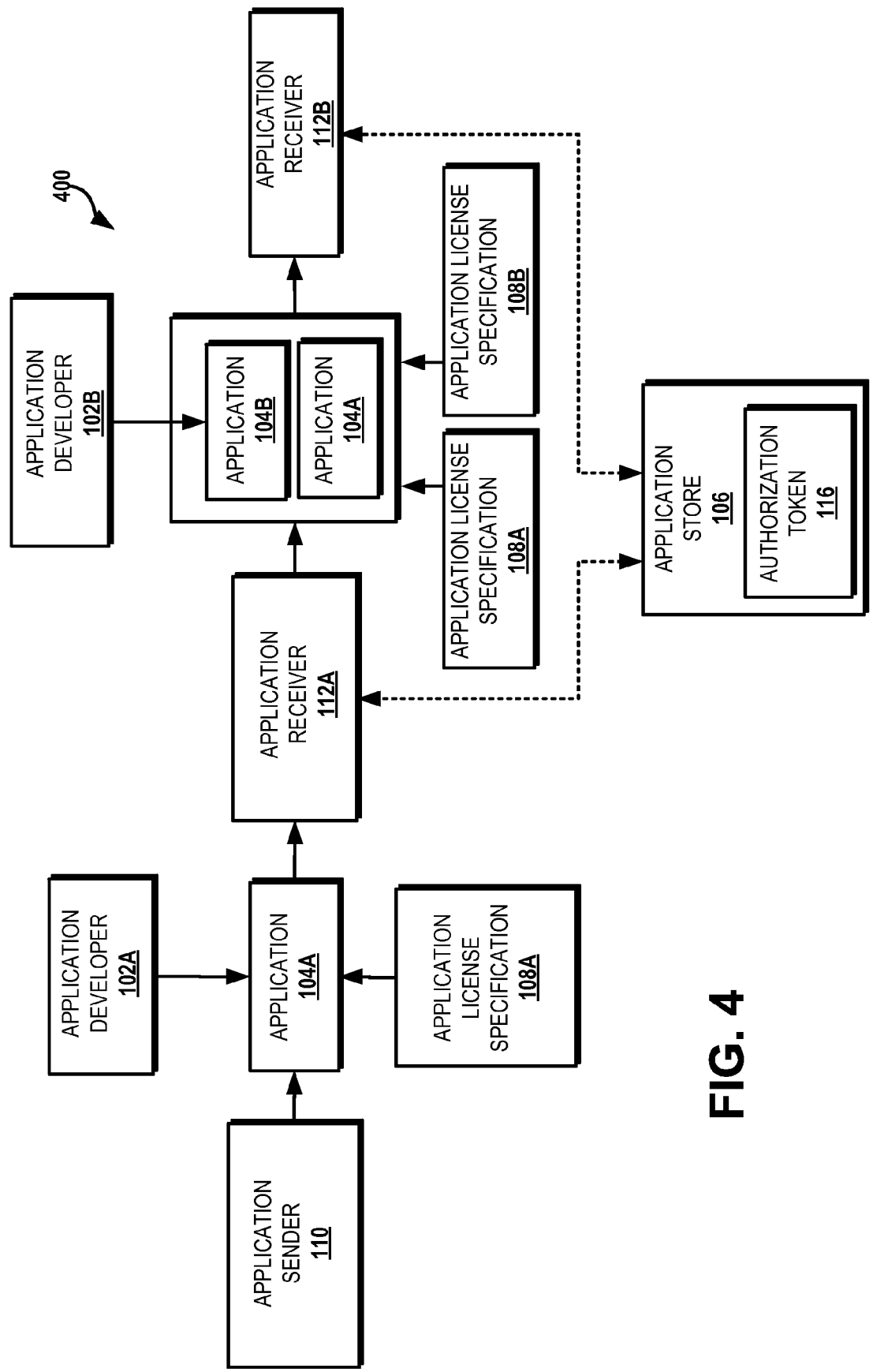
FIG. 4 is a system diagram illustrating a licensing mechanism for bundling multiple applications for use by an application receiver, in accordance with some embodiments.

In some configurations, the application receiver is not an end user of the application, but rather, is a person or entity that integrates the application into another package. For example, an application receiver can be a value added reseller ("VAR") that packages multiple applications for sale in a retail market. FIG. 4 is an illustration of a system 400 in which an application receiver may package one or more applications for sale.

As illustrated in FIG. 4, the application developer 102A has developed the application 104A that the application sender 110 wishes to provide for use by the application receiver 112A. In an implementation illustrated by the system 400, the application receiver 112A is a VAR. The application receiver 112A receives the application license specification 108A to the application 104A and packages the application 104A with the application 104B developed by the application developer 102B. As discussed above, the application license specification 108A may place restrictions on the application 104A.

In addition to the examples given above, the application license specification 108A may provide the breakdown of license fees. For example, the application receiver 112A may get a specific percentage of the license fee and the application store 106 may get a specific percentage, with the remainder going to the application developer 102A. In a further configuration, the application license specification 108A may also provide license fee splits if a direct sale of the application 104A is performed without the application receiver 112A. These and other examples of the application license specification 108A are considered to be within the scope of the present disclosure.

The application receiver 112A can communicate with the application receiver 112B that the combination of the application 104A and the application 104B is available for use by the application receiver 112B. The application receiver 112B can interface with the application store 106 and, through the validation or verification of the authorization token 116, may receive the necessary permissions and software to use the combination of the application 104A and the application 104B.

As illustrated by way of example in FIG. 4, a VAR, e.g. the application receiver 112A (or another entity), may be able to provide for an easier or more efficient way for the application receiver 112B to receive more than one application for use. The application receiver 112A can bundle together the application license specification 108A and the application license specification 108B, corresponding to the application 104A and the application 104B, respectively, and facilitate a transaction in which a single purchase can be performed by the application receiver 112B to use the applications 104A and 104B.

Further, the system 400 of FIG. 4 can provide the VAR with the flexibility to combine various applications in various combinations for purchase. Additionally, the VAR can use the authorization token 116 to control the distribution and use of the combination of the applications 104A and 104B. In that manner, in some implementations, the concepts and technologies described herein can facilitate the interaction of multiple developers by providing for the combination of multiple applications with rights of use secured through the use of a single instance of the authorization token 116.

Figure 5:
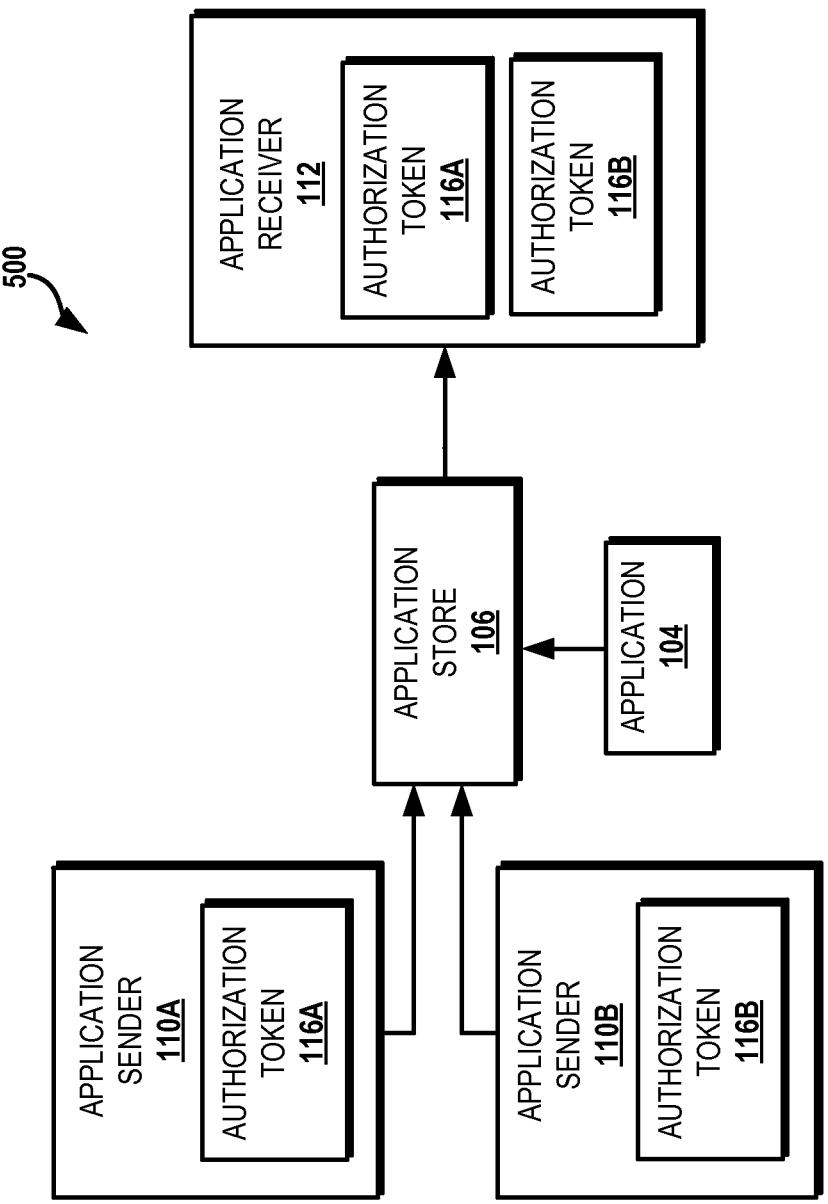
FIG. 5 is a system diagram illustrating multiple application senders combining authorization tokens for use by an application receiver, in accordance with some embodiments.

In some configurations, it may be advantageous for more than one application sender 110 to work together. FIG. 5 is an example system 500 illustrating multiple application senders 110A and 110B combining resources to provide for the use of an application by an application receiver. Illustrated in FIG. 5 are application senders 110A and 110B. In the exemplary implementation illustrated in FIG. 5, the application sender 110A and the application sender 110B have secured the rights to the application 104. The application sender 110A has secured the right to allow 3 uses (or "seats") of the application 104 and the application sender 110B has secured the right to allow 6 seats of the application 104. The application receiver 112 needs to use 8 seats. Thus, neither the application sender 110A nor the application sender 110B individually can provide the 8 seats required by the application receiver 112.

Therefore, in this configuration, the application sender 110A can combine the use of their seats with the seats secured by the application sender 110B in the application store 106. The application receiver 112 can communicate with the application store 106 that the application receiver 112 has the right to use the authorization token 116A associated with the application sender 110A and the authorization token 116B associated with the application sender 110B. Because the number of seats with combined authorization token 116A and 116B exceeds the number required by the application receiver 112, the application receiver 112 is able to secure the use of the application 104 under the terms established by the application sender 110A and the application sender 110B. As described above, these terms may include the time allowed for use, the time in which the application may be downloaded, as well as the licensing terms set forth by the developer of the application 104.

Figure 6:
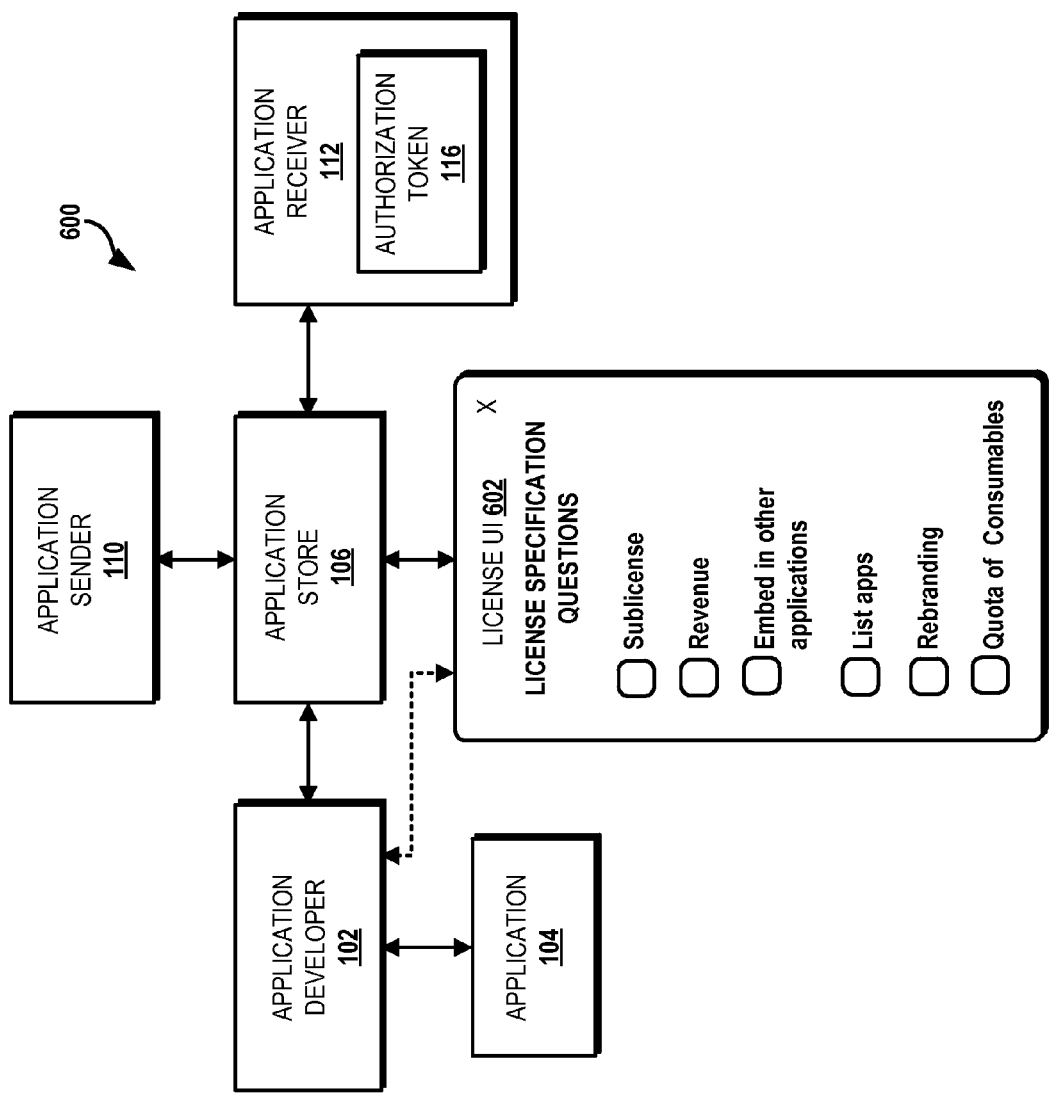
FIG. 6 is a system diagram and a user interface ("UI") illustrating how a developer may control an application license, in accordance with some embodiments.

FIG. 6 is a system diagram and a user interface ("UI") illustrating how a developer may control an application license by specifying the terms of the application license specification 108. The system 600 illustrates an exemplary way in which licensing terms may be incorporated into the application 104. The system 600 includes the application 104 that the developer 102 has developed or is currently developing. It should be understood that the present disclosure is not limited to the use of the system 600 for specifying the terms of the application license specification 108. For example, and not by way of limitation, the application developer 102 may specify the terms directly in the application 104 package, such as a manifest associated with the application 104. During development, the application developer 102 may desire that certain licensing terms apply to the application 104. Although not limited to any particular type of license, these terms may include a right to use, a right to copy, a right to distribute, as well as certain obligations or limitations of use placed on the user.

In the system 600, the application developer 102 may be presented with a license UI 602. The license UI 602 may have one or more check boxes or other types of UI controls that can facilitate receiving an input from the application developer 102. In the license UI 602, some exemplary inputs include the right of an end user to sublicense the application, how revenue (e.g. royalties) are to be assessed, whether or not the application 104 can be embedded with other applications, if the application 104 is to be listed with other applications developed by the application developer 102, if a party may rebrand the application 104, or a quota of consumables associated with the use of the application 104. It should be appreciated that the concepts and technologies described herein are not limited to any particular licensing terms or implementation of the license UI 602.

The license UI 602 is configured to receive the licensing terms input by the application developer 102. The application store 106 receives the licensing terms input into the license UI 602. When the application receiver 112 secure the rights to use the application 104, the licensing terms received from the license UI 602 may be integrated into the authorization token 116. In another implementation, a binary package containing the application 104 may also contain the application license specification 108. In a further implementation, the application license specification 108 may be stored separately from the application 104 within the application store 106. As described above, when the application sender 110 defines the distribution terms 114, the distribution terms 114 may be constrained by the application license specification 108.

Figure 7:
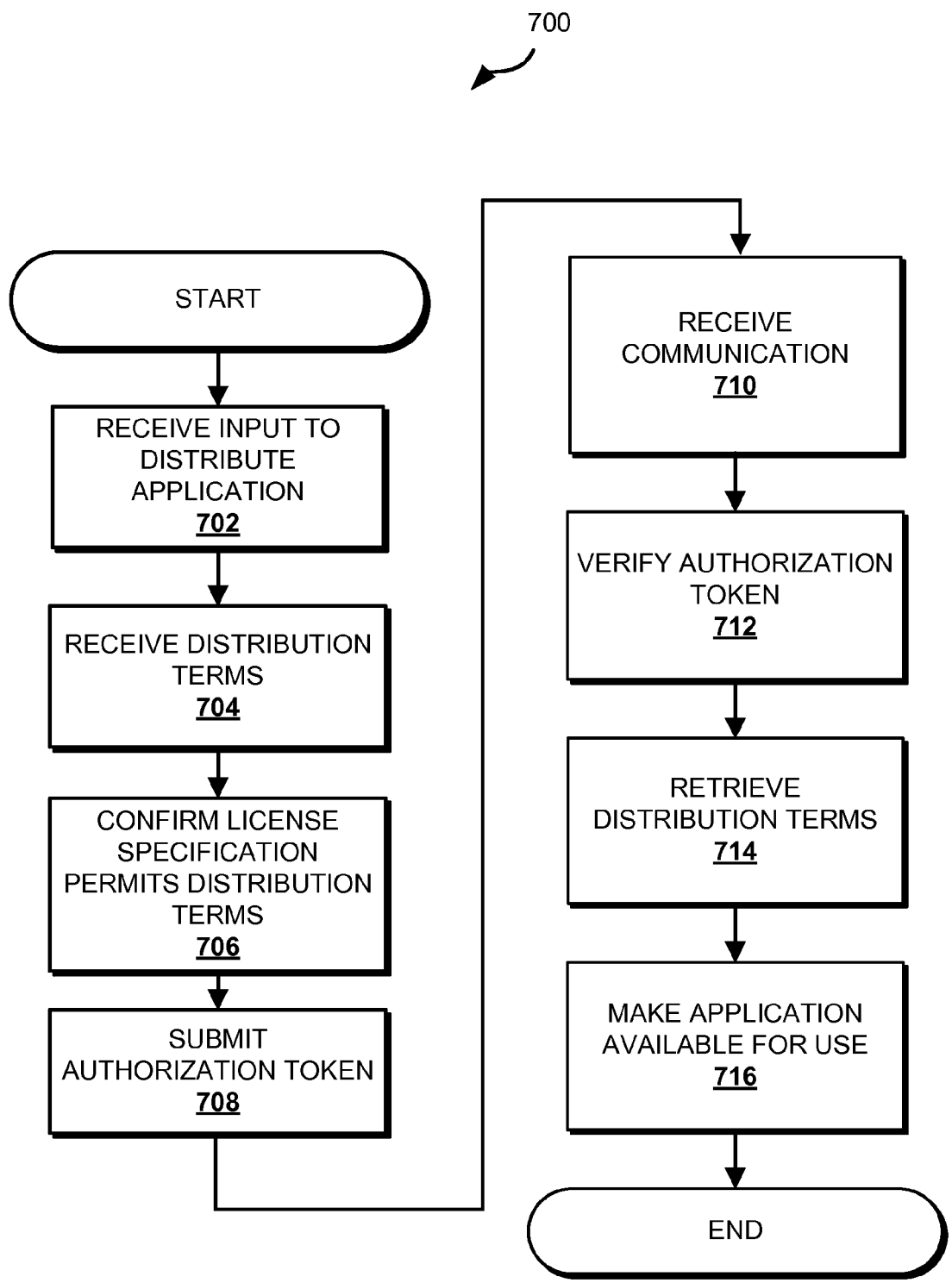
FIG. 7 is a block diagram illustrating an exemplary method for controlling application distribution using an authorization token, in accordance with some embodiments.

Turning now to FIG. 7, aspects of a method 700 for providing a mechanism for distributing applications are illustrated, according to one illustrative embodiment. Various implementations of the method 700 may be used to provide for a mechanism for distributing applications. It should be understood that the operations of the method 700 and other methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims. It also should be understood that the illustrated methods can be ended at any time and need not be performed in its entirety.

Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

Turning to FIG. 7, the method 700 begins and proceeds to operation 702, where an input is received to distribute the application 104. Although not limited to any particular origin, the input to distribute the application 104 may be generated by the application sender 110. The application sender 110 may determine that the application 104 located for distribution at the application store 106 is necessary or desired in order to collaborate with one or more application receivers 112A-112N. In some configurations, the application sender 110 may access the application store 106 and select the application 104. In other configurations, the application sender 110 may access a system and input functional criteria to be provided by one or more applications. The system described above may then process the input and select for distribution one or more applications that meet the functional criteria set forth by the application sender 110.

From operation 702, the method 700 proceeds to operation 704, where distribution terms 114 are received. The distribution terms 114 can include, but are not limited to, the identity of the application receivers 112, a timeframe in which the application receivers 112 may secure the right and ability to use the application 104, or a timeframe in which the application receivers 112 may use the application 104. The distribution terms 114 may be generated by the application sender 110 or another entity. In one example, the application sender 110 and the application receivers 112 may work for an organization that has established various criteria under which the application sender 110 and the application receivers 112 work. Thus, in this example, the distribution terms 114 may be generated by the entity in order to foster or administer the collaboration between the application sender 110 and the application receivers 112. It should be understood that the concepts and technologies described herein are not limited to any particular source or type of distribution terms 114.

From operation 704, the method 700 proceeds to operation 706, where the distribution terms 114 are confirmed. While the application store 106 may have some level of verification of the distribution terms 114 against the specified constraints of the application store 106, such as store policies, and specified constraints of the application license specification 108, a further user-specific check may take place. In operation 706, information is obtained about the application receivers 112. The information may include, but is not limited to, whether the application receivers 112 have owned the application 104 before, whether the application receivers 112 are from a country that the application developer 102 wishes to distribute to, and the like.

In some implementations, the application receivers 112 may or may not provide further information, such as a human-readable personal name or a justification for usage, before submitting a request to use the application 104. In these implementations, the identity of the particular application receivers 112, in addition to any information the application receivers 112 provide, may be transmitted to the application sender 110. The application sender 110 may then review this information and, together with the authorization token 116, create the receiver license 119 for the particular application receivers 112. For example, an application sender 110 may send a group email to a team announcing that the team has acquired 5 licenses of the application 104 for the most worthy users of a social analysis tool. In this example, the application receivers 112 may request the use of the application 104. The application sender 110 may use information provided by the application receivers 112 to determine which 5 of the application receivers 112 requesting the use of the application 104 may use the application 104.

In another example, the application license specification 108 may require that use of the application 104 only be established for an individual known at the time of the receipt of the distribution terms 114 or specified by the authorization token 116. In some implementations, to enable this requirement, the application receivers 112 may be required to sign in with an identity and username known to the application store 106. In a further implantation, the authorization token 116 may require that a particular password or PIN be entered for the application receivers 112 to be granted a receiver license 119. This information can be then compared against the distribution terms 114 as transmitted in the authorization token 116.

If the application license specification 108 allows the application 104 to be distributed according to the distribution terms 114, the method 700 proceeds to operation 708, where the authorization token 116 is generated and transmitted to the application sender 110. The authorization token 116 may encapsulate the terms identified in the application license specification 108, the distribution terms 114 and any restrictions added by the application store 106. Further, the authorization token 116 may also encapsulate a receiver license 119 generated in accordance with the information encapsulated by the authorization token 119. The authorization token 116 can be used by the application sender 110 to control the distribution of the application 104. In a further implementation, the receiver license 119 may not be generated until the use of the application 104 by the application receivers 112 is authorized.

As described above, the authorization token 116 can be software, hardware, a password, or other forms of information or technology, the concepts and technologies described herein not being limited to any particular form for the authorization token 116. Once the authorization token 116 is generated, signifying a successful purchase of the application 104 by the application sender 110 under the distribution terms 114, the application sender 110 can send a communication to the application receivers 112 providing information that allows the application receivers 112 to access and use the application 104. It should be understood that a transaction relating to the purchase of the application 104 may occur in ways other than the configuration provided above. For example, the distribution terms 114 or the authorization token 116 may specify that the application receivers 112 must remit a payment of some form to the application store 106 prior to being able to use the application 104.

The method 700 proceeds to operation 710, where a communication is received from one or more of the application receivers 112 requesting the use of the application 104. The communication may include the authorization token 116 if the authorization token 116 was transmitted to the application receivers 112, along with other information that the application receivers 112 may be required to provide in accordance with the authorization token 116.

From operation 710, the method 700 proceeds to operation 712, where the transaction is verified according to the authorization token 116. For example, the authorization token 116 may have certain identification requirements that the application receivers 112 must present in order to verify that the party submitting the communication is the correct party to receive the application 104. In another implementation, the authorization token 116 may be the information verified. For example, in some configurations, the party submitting the communication may have possession of the authorization token 116. The authorization token 116 may be self-verifying data. In another configuration, the entity receiving the communication may communicate with the application sender 110 and request that the application sender 110 verify the entity submitting the communication.

In response to the verification of the authorization token 116, the method 700 proceeds from operation 712 to operation 714, where the distribution terms 114 are received and communicated to the entity that sent communication. In some configurations, the distribution terms 114 may need to be agreed to by the entity that sent the communication. In other configurations, the distribution terms, which may incorporate the terms of the application license specification 108, may be pre-approved. From operation 714, the method 700 proceeds to operation 716 where the application 104 is made available for use under the distribution terms 114. The method 700 then ends.

Figure 8:
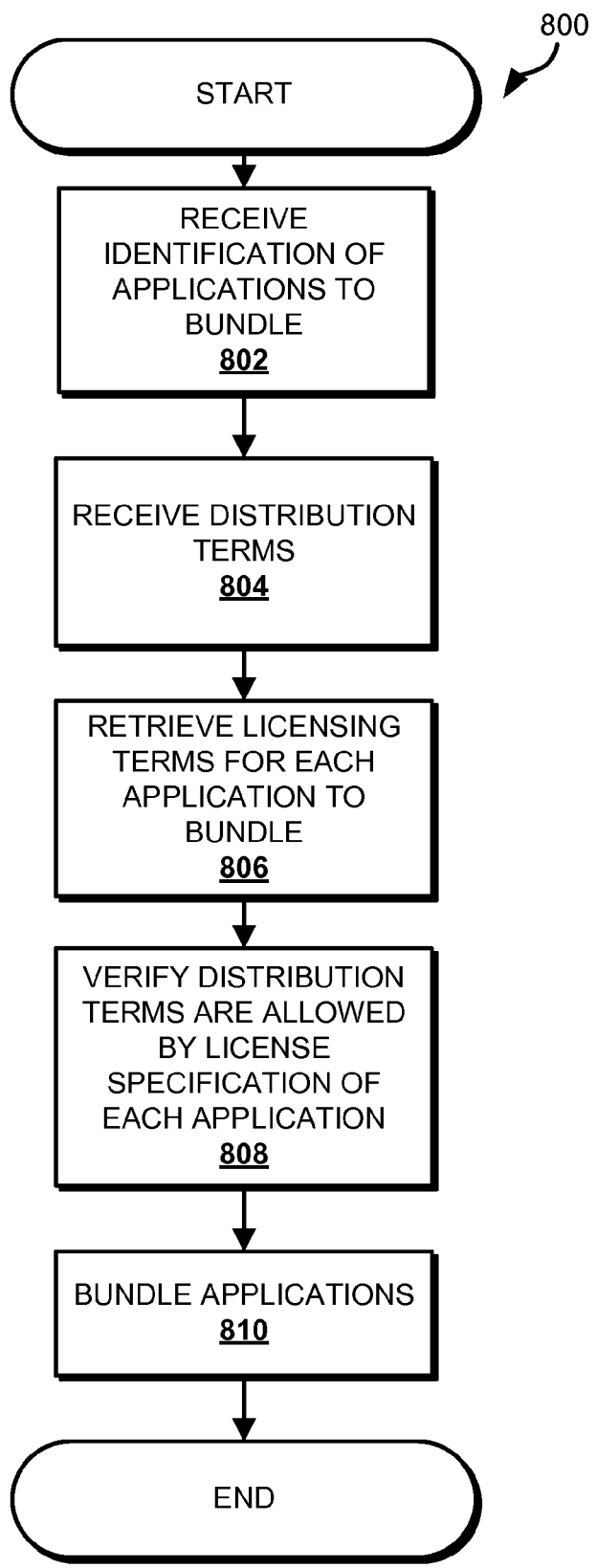
FIG. 8 is a block diagram illustrating an exemplary method for bundling applications, in accordance with some embodiments.

As described above, the application 104A may be combined or bundled with one or more applications 104B-104B and distributed to the application receivers 112. FIG. 8 illustrates aspects of a method 800 for bundling applications, according to an illustrative embodiment. The method 800 starts and proceeds to operation 802, where the applications to be bundled are identified. As used herein, a "bundle" may include any combination of one or more applications in various manners. For example, several applications may be bundled together and made available for use by the application receivers 112 under the distribution terms 114 and the application license specification 108 for the authorization token 116. In another example, several applications may be combined in the manner described by way of example in FIG. 3A and/or FIG. 3B, above.

From operation 802, the method 800 proceeds to operation 804, where the distribution terms are received. As described above, the distribution terms may come from various sources, including, but not limited to, the application sender 110. From operation 806, the method 800 proceeds to operation 806, where the license specifications for the several applications are retrieved. Although the concepts and technologies described herein are not so limited, it may be necessary to retrieve the license specifications of one or more of the applications in order to ensure that one or more of the applications can be distributed in accordance with the distribution terms 114 while meeting the requirements set forth by the various license specifications.

At operation 808, the distribution terms are verified as allowable by the licensing terms of the applications. From operation 808, the method 800 proceeds to operation 810, where the applications are bundled in some manner for distribution to the application receivers 112. From operation 810, the method 800 ends.

FIG. 9 is an illustrative computer architecture 900 for a device capable of executing the software components described above. Thus, the computer architecture 900 illustrated in FIG. 9 illustrates an architecture for a server computer, mobile phone, a PDA, a smart telephone, a desktop computer, a netbook computer, a tablet computer, and/or a laptop computer. The computer architecture 900 may be utilized to execute any aspects of the software components presented herein. For example, the computer architecture 900 may be used to implement the application store 106.

The computer architecture 900 illustrated in FIG. 9 includes a central processing unit ("CPU") 902, a system memory 904, including a random access memory 906 ("RAM") and a read-only memory ("ROM") 908, and a system bus 910 that couples the memory 904 to the CPU 902. A basic input/output system containing the basic routines that help to transfer information between elements within the computer architecture 900, such as during startup, is stored in the ROM 908. The computer architecture 900 further includes a mass storage device 912 for storing the authorization token 116, the application license specification 108, or the application 104 of FIG. 1.

The mass storage device 912 is connected to the CPU 902 through a mass storage controller (not shown) connected to the bus 910. The mass storage device 912 and its associated computer-readable media provide non-volatile storage for the computer architecture 900. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 900.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer architecture 900. For purposes of the claims, the phrase "computer storage medium," and variations thereof, does not include waves or signals per se and/or communication media.

According to various embodiments, the computer architecture 900 may operate in a networked environment using logical connections to remote computers through a network such as the network 118. The computer architecture 900 may connect to the network 118 through a network interface unit 916 connected to the bus 910. It should be appreciated that the network interface unit 916 also may be utilized to connect to other types of networks and remote computer systems. The computer architecture 900 also may include an input/output controller 918 for receiving and processing input from a number of other devices, including a keyboard, mouse, or electronic stylus. Similarly, the input/output controller 918 may provide an output to a display screen, a printer, or other type of output device.

It should be appreciated that the software components described herein may, when loaded into the CPU 902 and executed, transform the CPU 902 and the overall computer architecture 900 from a general-purpose computing system into a special-purpose computing system customized to facilitate the functionality presented herein. The CPU 902 may be constructed from any number of transistors or other discrete circuit elements, which may individually or collectively assume any number of states. More specifically, the CPU 902 may operate as a finite-state machine, in response to executable instructions contained within the software modules disclosed herein. These computer-executable instructions may transform the CPU 902 by specifying how the CPU 902 transitions between states, thereby transforming the transistors or other discrete hardware elements constituting the CPU 902.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this description.

In light of the above, it should be appreciated that many types of physical transformations take place in the computer architecture 900 in order to store and execute the software components presented herein. It also should be appreciated that the computer architecture 900 may include other types of computing devices, including hand-held computers, embedded computer systems, personal digital assistants, and other types of computing devices known to those skilled in the art. It is also contemplated that the computer architecture 900 may not include all of the components shown in FIG. 9, may include other components that are not explicitly shown in FIG. 9, or may utilize an architecture completely different than that shown in FIG. 9.

Based on the foregoing, it should be appreciated that concepts and technologies for distributing applications have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for distributing an application, the method comprising:
   receiving, by a computer, from an application sender a selection of an application to be used by an application receiver, the application associated with an application license specification;
   receiving, by the computer, distribution terms from the application sender under which the application is to be distributed;
   analyzing the distribution terms received from the application sender against the application license specification to verify that the application license specification permits the distribution of the application to the application receiver according to the distribution terms;
   generating an authorization token to control the distribution of the application based on the application license specification and the distribution terms from the application sender upon verification that the application license specification permits the distribution of the application to the application receiver according to the distribution terms; and sending the authorization token to the application sender.

2. The method of claim 1, wherein the authorization token encapsulates the application license specification, the distribution terms, or a restriction placed on the application by an application store providing the application.

3. The method of claim 1, wherein the application license specification is provided by a developer of the application or is a hardcoded default encapsulated in an application store providing the application.

4. The method of claim 1, further comprising generating a receiver license based on the authorization token.

5. The method of claim 1, further comprising receiving a communication from the application receiver comprising a request to use the application.

6. The method of claim 5, wherein the communication from the application receiver comprises the authorization token.

7. The method of claim 6, further comprising verifying that the request to use the application is permitted under the distribution terms by verifying information associated with the authorization token and the application receiver.

8. The method of claim 7, further comprising transmitting the application to the application receiver in response to verifying the information associated with the authorization token and the application receiver.

9. The method of claim 6, wherein the communication from the application receiver further comprises a request to utilize a second authorization token associated with the application, and wherein the authorization token and the second authorization token are associated with a number of seats of the application that the application receiver can use.

10. The method of claim 1, further comprising revoking a use of the application by the application receiver.

11. The method of claim 1, wherein the authorization token encapsulates a password, a timeframe to use the application, a communication that the application is ready for distribution to the application receiver, or a personal identification number.

12. A computer, comprising:
a hardware processor; and a computer-readable storage medium in communication with the processor, the computer-readable storage medium comprising computer-executable instructions stored thereupon which, when executed by the hardware processor, cause the hardware processor to receive from an application sender a selection of an application to be used by an application receiver, the application associated with an application license specification; receive distribution terms from the application receiver under which the application is to be distributed, the distribution terms comprising a level of control the application sender permits the application receiver to have when using the application; analyze the distribution terms received from the application sender against the application license specification to verify that the application license specification permits the distribution of the application to the application receiver according to the distribution terms; generate an authorize token that encapsulates the distribution terms and the application license specification upon verification that the application license specification permits the distribution of the application to the application receiver according to the distribution terms; and send the authorization token to the application sender.

13. The computer of claim 12, further comprising computer-executable instructions that, when executed by the processor, cause the hardware processor to associate the authorization token with a license associated with the application.

14. The computer of claim 12, further comprising computer-executable instructions that, when executed by the hardware processor, cause the processor to transmit a license payment to a developer of the application upon receipt of a communication to utilize the authorization token or upon payment by the application sender.

15. The computer of claim 12, further comprising computer-executable instructions that, when executed by the hardware processor, cause the hardware processor to receive a communication from the application receiver comprising a request to use the application.

16. The computer of claim 15, further comprising computer-executable instructions that, when executed by the hardware processor, cause the hardware processor to integrate a first receiver license associated with the application with a second receiver license associated with the second application.

17. The computer of claim 16, wherein the application and the second application are bundled so that a second application receiver receives the right to use both the application and the second application in a single transaction.

18. An optical disk, a magnetic storage device, or a solid state storage device comprising computer-executable instructions stored thereupon which, when executed by a computer, cause the computer to:
receive from an application sender a selection of an application to be used by an application receiver, the application associated with an application license specification;
receive distribution terms from the application receiver under which the application is to be distributed;
analyze the distribution terms received from the application sender against the application license specification to verify that the application license specification permits the distribution of the application to the application receiver according to the distribution terms;
generate an authorization token upon verification that the application license specification permits the distribution of the application to the application receiver according to the distribution terms;
associate the authorization token with the distribution terms and the application license specification;
send the authorization token to the application sender;
receive a request from an application receiver to use the application;
verify the authorization token; and
make the application available for use by the application receiver if the authorization token is verified.

* * * * *